(12) United States Patent
Kisu et al.

(10) Patent No.: US 11,611,199 B2
(45) Date of Patent: Mar. 21, 2023

(54) FIXING METHOD OF WIRE HARNESS

(71) Applicant: Yazaki Corporation, Tokyo (JP)

(72) Inventors: Naomi Kisu, Susono (JP); Hisashi Takemoto, Susono (JP); Atsuyoshi Yamaguchi, Susono (JP); Makoto Nakayama, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 733 days.

(21) Appl. No.: 16/567,288

(22) Filed: Sep. 11, 2019

(65) Prior Publication Data

US 2020/0091689 A1    Mar. 19, 2020

(30) Foreign Application Priority Data

Sep. 18, 2018 (JP) .............................. JP2018-173258

(51) Int. Cl.
*H02G 1/06* (2006.01)
*B60R 16/02* (2006.01)
*H01B 7/00* (2006.01)
*H02G 3/30* (2006.01)

(52) U.S. Cl.
CPC ........... *H02G 1/06* (2013.01); *B60R 16/0215* (2013.01); *H01B 7/0045* (2013.01); *H02G 3/305* (2013.01)

(58) Field of Classification Search
CPC .............. B60R 21/214; B60R 16/0207; B60R 16/0215; H01B 7/0045; H01B 13/01254; H01B 13/01263; H01B 5/02; H01B 7/00; H02G 3/305; H02G 1/06; H02G 3/02; H02G 3/30; H02G 3/04; H02G 3/36; H02G 3/266; H02G 3/32; H02G 3/34
See application file for complete search history.

(56) References Cited

U.S. PATENT DOCUMENTS

| | | | | |
|---|---|---|---|---|
| 11,370,370 | B2* | 6/2022 | Kisu | H02G 3/305 |
| 2008/0190544 | A1* | 8/2008 | Hopf | H02G 3/30 |
| | | | | 156/73.5 |
| 2018/0005726 | A1* | 1/2018 | Hiramitsu | H01B 3/308 |
| 2020/0062198 | A1* | 2/2020 | Mizushita | H02G 3/32 |

FOREIGN PATENT DOCUMENTS

| | | | | |
|---|---|---|---|---|
| CN | 107695214 A | | 2/2018 | |
| GB | 1576546 A | * | 10/1980 | ............... B32B 3/28 |
| JP | H11308741 A | * | 4/1998 | ............... H02G 3/26 |
| JP | 2000-264137 A | | 9/2000 | |
| JP | 2000-264249 A | | 9/2000 | |
| JP | 2000-335329 A | | 12/2000 | |
| JP | 2002-67829 A | | 3/2002 | |
| JP | 2002-112440 A | | 4/2002 | |
| JP | 2002-249004 A | | 9/2002 | |

(Continued)

*Primary Examiner* — Krystal Robinson
(74) *Attorney, Agent, or Firm* — Sughrue Mion, PLLC

(57) ABSTRACT

A fixing method of a wire harness is provided. A wire harness structure is formed by covering a wire harness with a sheet material in which a thermoplastic adhesive is coated on one surface including a required portion so as to fix the wire harness to the sheet material. The formed wire harness structure is spread on a roof liner. By pressuring the required portion warmed, the wire harness structure is fixed to the roof liner with the thermoplastic adhesive.

4 Claims, 4 Drawing Sheets

(56) References Cited

FOREIGN PATENT DOCUMENTS

| | | |
|---|---|---|
| JP | 2004-74954 A | 3/2004 |
| JP | 2006-76531 A | 3/2006 |
| JP | 2006-96856 A | 4/2006 |
| JP | 2006-205812 A | 8/2006 |
| JP | 2012-99301 A | 5/2012 |
| JP | 2012-140496 A | 7/2012 |
| JP | 2012-155991 A | 8/2012 |
| JP | 2012-157158 A | 8/2012 |
| JP | 2014-136536 A | 7/2014 |
| JP | 2015-90783 A | 5/2015 |
| JP | 2018-90229 A | 6/2018 |
| WO | 2014050196 A1 | 4/2014 |

* cited by examiner

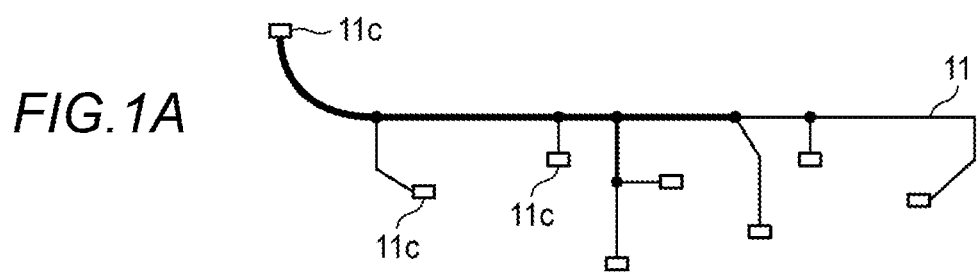
FIG.1A
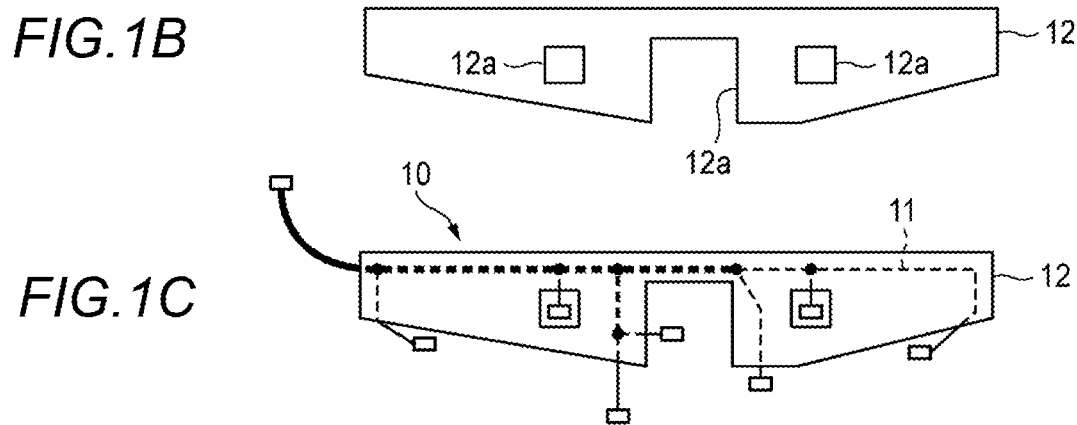
FIG.1B
FIG.1C
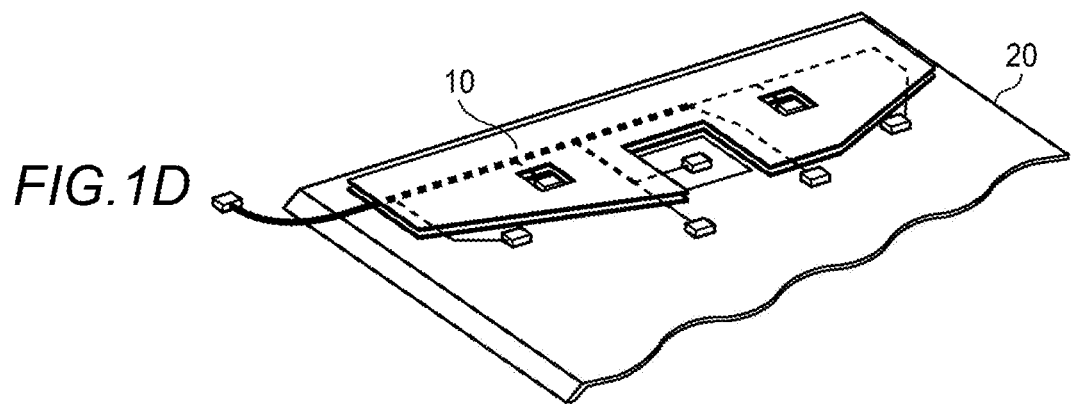
FIG.1D
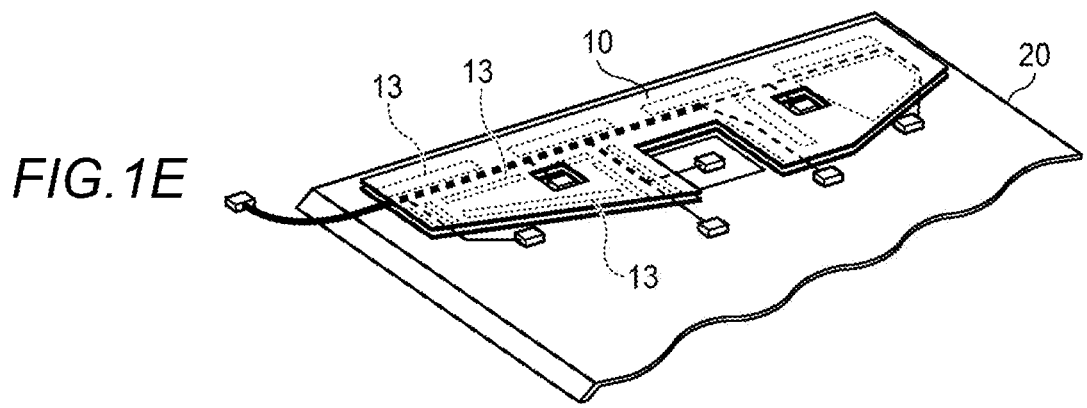
FIG.1E

FIXING METHOD OF WIRE HARNESS

CROSS-REFERENCE TO RELATED APPLICATIONS

This application is based on and claims priority under 35 USC 119 from Japanese Patent Application No. 2018-173258 filed on Sep. 18, 2018, the contents of which are incorporated herein by reference.

TECHNICAL FIELD

The present invention relates to a method of fixing a wire harness to a roof liner of an automobile.

BACKGROUND ART

As a method of wiring and fixing a wire harness to a roof liner of an automobile, a double-side adhesive tape is attached to a required portion of a back surface of the roof liner for an automobile, and the attachment onto the double-side adhesive tape is performed along the wire harness (see, for example, Patent Literatures 1 to 3).

Further, there is a method in which a jig is disposed on a wiring path of a wire harness and the wire harness is wired, and then a melted resin is poured between a roof liner and the wire harness to stick the two (see, for example, Patent Literature 4). There is also a method of fixing a wire harness to a roof liner using a sheet material that can be thermally welded (see, for example, Patent Literatures 5 and 6).

Further, in Patent Literature 7, a bulging portion is provided on a molded ceiling of an automobile, and a wire harness is inserted into the bulging portion to accommodate and hold the wire harness, thereby providing a harness holding function for the molded ceiling itself. In Patent Literature 8, a wire harness is pushed into a U-shaped melting member including a harness accommodating portion, and the melting member is heated and melted, thereby bonding the wire harness to a molded body (roof liner). In addition, in Patent Literature 9, in a state where an electric wire (wire harness) is sandwiched between a base material made of a synthetic resin constituting a roof head lining which is an interior member for a vehicle and a backing sheet thereof, the base material and the backing sheet are bonded by melting a joint surface therebetween.

On the other hand, a wire harness in which an electric wire is sandwiched between two laminated films has been proposed in order to easily regulate a path of the electric wire (see, for example, Patent Literatures 10 to 12). In addition, in Patent Literature 13, in order to prevent vibration of a harness, harness units holding the harness between a pair of sheets are bonded and fixed to a back surface of a head lining, which is an interior panel. Further, Patent Literature 14 discloses a wire harness assembly in which a wire harness is wired between a soundproof material and a protective material in order to ensure soundproof performance and heat insulation performance while preventing an increase in weight.

CITATION LIST

Patent Literature

Patent Literature 1: JP-A-2000-264137
Patent Literature 2: JP-A-2014-136536
Patent Literature 3: JP-A-2000-264249
Patent Literature 4: JP-A-2000-335329
Patent Literature 5: JP-A-2015-90783
Patent Literature 6: JP-A-2006-96856
Patent Literature 7: JP-A-2006-76531
Patent Literature 8: JP-A-2002-249004
Patent Literature 9: JP-A-2002-67829
Patent Literature 10: JP-A-2012-99301
Patent Literature 11: JP-A-2012-155991
Patent Literature 12: JP-A-2012-157158
Patent Literature 13: JP-A-2004-74954
Patent Literature 14: JP-A-2018-90229

SUMMARY OF INVENTION

However, in the above techniques, there is room for improvement as described below in workability of assembling the wire harness. As described in Patent Literature 1, in a case where the wire harness is fixed to the roof liner using the double-side adhesive tape, the electric wires are bundled and a cross section thereof is round but not uniform in the wire harness. For this reason, a bonding surface between the double-side adhesive tape and the wire harness cannot be secured sufficiently due to the non-uniform shape and certain fixing is difficult, even though the wire harness is arranged on the double-side adhesive tape. Further, in order to increase certainty of the fixing, the bonding surface is increased by enclosing a plurality of unbundled electric wires with a flexible sheet in Patent Literature 2, and a terminal portion of the wire harness and an ear piece extending to a peripheral portion of the molded ceiling of an automobile are tied by the adhesive tape in the Patent Literature 3. However, it cannot be said that the wire harness is still fixed to the roof liner certainly in addition to the peripheral portion.

The method described in Patent Literature 4 requires large-scale dedicated equipment for bonding. In the methods described in Patent Literatures 5 and 6, it takes time and effort to peel off an end of the sheet wound around the wire harness, and then expand the sheet again and weld the sheet. The method described in Patent Literature 7 requires processing of the molded ceiling. In the method of Patent Literature 8, the melting member is disposed on a wiring path of the wire harness and temporarily bonded, the wire harness is pushed into the harness accommodating portion, and then the melting member is melted, cooled, and solidified in the roof liner in advance. Therefore, before the melting operation, operation such as temporary bonding is required, which takes time and effort. Further, in the method of Patent Literature 9, large-scale equipment for heating the base material is required before bonding between the base material and the backing sheet.

Patent Literatures 10 to 12 disclose that the wire harness in which the electric wire is sandwiched between two laminated films is suitable for laying to a back side of a roof trim, but does not disclose details of the wire harness laying. In Patent Literature 13, since the harness units are bonded with a bonding agent or a double-side bonding tape, a bonding surface may be peeled off. Patent Literature 14 discloses that the wire harness assembly is disposed between a ceiling of a vehicle and a roof liner, but does not disclose fixing of the wire harness assembly.

The present invention has been made in view of the above circumstances, and an object thereof is to provide a method of fixing a wire harness which can improve workability when assembling the wire harness to a roof liner of an automobile and can be fixed certainly.

In order to achieve the above object, the method of fixing a wire harness according to the present invention is characterized by the following (1) to (4).

(1) A fixing method of fixing a wire harness including:

forming a wire harness structure by covering a wire harness with a sheet material in which a thermoplastic adhesive is coated on one surface including a required portion so as to fix the wire harness to the sheet material;

spreading the formed wire harness structure on a roof liner; and fixing the wire harness structure to the roof liner with the thermoplastic adhesive by pressurizing the required portion warmed.

(2) The fixing method of fixing a wire harness having the configuration of the above (1), in which the required portion is pressurized by a pressurizing member in a state in which the required portion is warmed to generate adhesiveness of the thermoplastic adhesive.

(3) The fixing method of fixing a wire harness having the configuration of the above (1), in which the pressurizing member can also be heated, and the required portion is pressurized while being warmed by the pressurizing member.

(4) The method of fixing a wire harness having the configuration of any one of the above (1) to (3), in which the wire harness is covered by being sandwiched between two sheets of the sheet material.

According to the method of fixing a wire harness having the configuration of the above (1), the wire harness structure in which the wire harness is fixed to the sheet material in advance is formed, and by fixing the wire harness structure to the roof liner via the thermoplastic adhesive, it is possible to easily fix the wire harness to the roof liner without performing operation which takes time and effort such as wiring along a path while loosening entanglement of the wire harness. Therefore, the wiring operation on an assembly line can be simplified, and assembly operation time can be shortened. Further, the wire harness can be fixed to the roof liner without requiring a special structure such as processing of an attachment side or a fixing member such as a clip. Further, since the sheet material to which the wire harness is assembled and the roof liner are fixed by the anchor effect of the adhesive (thermoplastic adhesive), certain fixation is possible, and quality is stabilized.

According to the fixing method of a wire harness having the configuration of the above (2), the required portion is warmed in advance, so that there is no need for an equipment for warming the required portion when the wire harness is fixed to the roof liner.

According to the fixing method of a wire harness having the configuration of the above (3), heating and pressurization can be performed at the same time, and man-hour can be reduced.

According to the fixing method of a wire harness having the configuration of the above (4), since the wire harness is sandwiched between two sheets of the sheet material and fixed, a shape conforming to a wiring path of the wire harness can be maintained certainly.

According to the present invention, it is possible to fix the wire harness to the roof liner easily and certainly without performing operation which takes effort and time such as wiring along the path while loosening the entanglement of the wire harness.

The present invention has been described briefly above. Further, details of the present invention will be clarified by reading a mode for carrying out the invention (hereinafter, referred to as "embodiment") described below with reference to attached drawings.

BRIEF DESCRIPTION OF DRAWINGS

FIG. 1A to 1E are diagrams for illustrating a method of fixing a wire harness in an embodiment of the present invention.

DESCRIPTION OF EMBODIMENTS

Figure 2A:
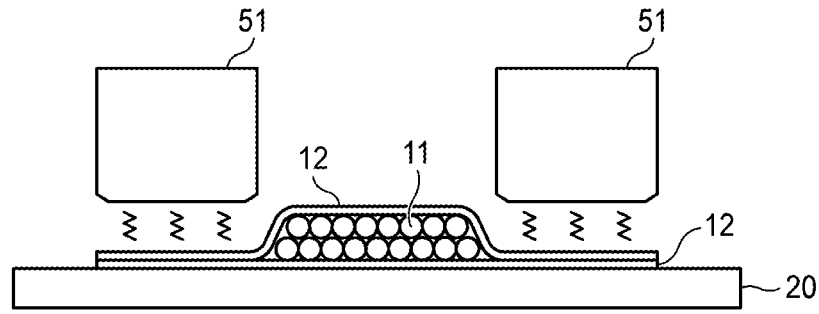
FIG. 2A to 2C are diagrams for illustrating steps of fixing a wire harness structure to a roof liner in the embodiment of the present invention.

A specific embodiment according to the present invention is described below with reference to the drawings. In the present embodiment, a wire harness is fixed to a roof liner fixed to a sheet material, and is assembled to a ceiling covering an upper portion of a vehicle interior of an automobile. FIG. 1A to 1E are diagrams for illustrating a method of fixing a wire harness in an embodiment of the present invention. FIG. 1A shows a wire harness 11, FIG. 1B shows a sheet material 12, FIG. 1C shows a wire harness structure 10, FIG. 1D shows a state in which the wire harness structure 10 is spread on a roof liner 20, and FIG. 1E shows an arrangement of a bonding portion 13 in FIG. 1D.

Figure 3:
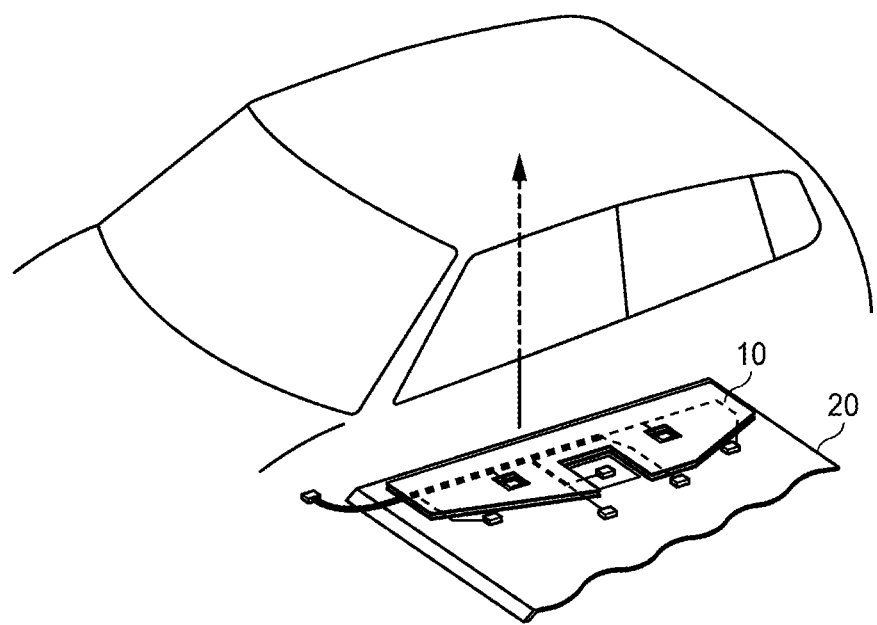
FIG. 3 is a diagram showing a state in which the roof liner to which the wire harness is fixed is attached to a ceiling of a vehicle interior in the embodiment of the present invention.

The wire harness 11 shown in FIG. 1A includes a flat cable composed of a bundle of a plurality of electric wires, and a terminal connector 11c provided on a terminal of the flat cable. In the present embodiment, in view of a fact that the wire harness 11 is wired in a ceiling space of a vehicle, a case where the wire harness 11 is configured in a flat cable shape is described, but the wire harness 11 may have another cross-sectional shape such as a cross-sectional circular shape. The sheet material 12 shown in FIG. 1B is fixed by covering the wire harness 11, and the wire harness 11 is sandwiched between two sheet materials and fixed in a wired state so that each terminal connector 11c is arranged at a predetermined position. A thermoplastic adhesive such as a hot melt is primer treated (primed) on a surface of the sheet material 12 facing the roof liner 20. An attachment window portion 12a is formed in the sheet material 12, and various electrical devices equipped on the ceiling are disposed in the attachment window portion 12a. Various materials such as soft plastic, foamed plastic, paper, and a molded sheet can be applied to the sheet material 12 in accordance with conditions of a side to which the wire harness structure 10 is fixed. The wire harness structure 10 shown in FIG. 1C includes the wire harness 11 and the sheet material 12, and the wire harness 11 is covered by being sandwiched between two sheet materials 12. The two sheet materials 12 are pasted together to each other by a known method such as an adhesive. In the wire harness structure 10, the wire harness 11 is fixed to the sheet material 12 in a form conforming to the wiring path when disposed in the vehicle. The roof liner 20 shown in FIG. 1D is a molded body used for the ceiling of the vehicle. The wire harness structure 10 is fixed to the roof liner 20, and is assembled to a vehicle interior side which is an inner surface side of the ceiling covering the upper portion of the vehicle interior of the automobile (see FIG. 3).

In the present embodiment, a method of fixing the wire harness 11 to the roof liner 20 is described. First, the wire harness 11 is fixed to the sheet material 12 by covering the wire harness 11 with the sheet material 12 coated with a thermoplastic adhesive to form the wire harness structure 10 (see FIG. 1C). Next, when the formed wire harness structure 10 is spread on the roof liner 20, the terminal connector 11c of the wire harness 11 is disposed at a proper position (a position suitable for connecting the terminal connector 11c to a power supply device, various electrical devices, and the like when the roof liner 20 is assembled to the ceiling 20) (see FIG. 1D). Then, in accordance with a method to be described later, the wire harness structure 10 is fixed to the roof liner 20 by pressurizing the bonding portion (required portion) 13 shown in FIG. 1E with a pressurizing member.

Figure 2B:
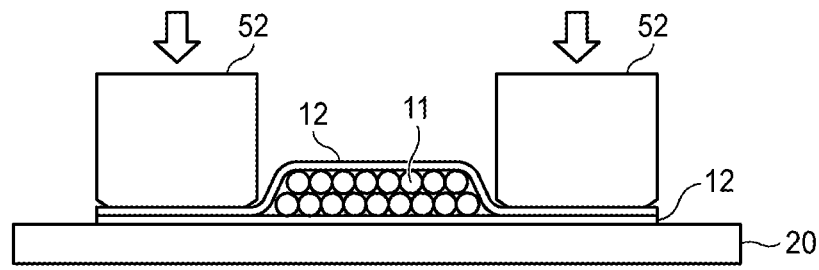
Figure 2C:
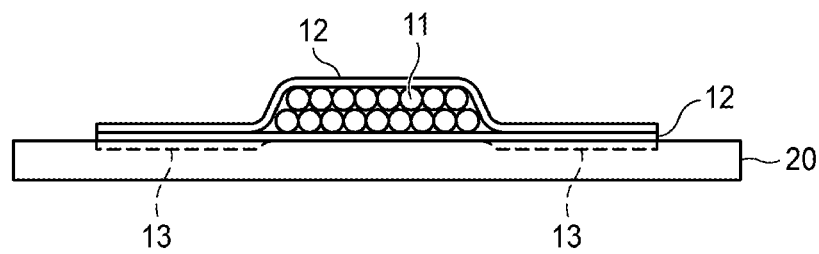

FIG. 2A to 2C are diagrams for illustrating steps of fixing a wire harness structure 10 to a roof liner 20 in the embodiment of the present invention. In the thermoplastic adhesive, adhesiveness is generated by warming a required portion by, for example, a heating member 51 (see FIG. 2A). The sheet material 12 is fixed to the roof liner 20 by the thermoplastic adhesive (see FIG. 2C) by pressurizing the bonding portion 13 of the sheet material 12 with a pressurizing member 52 (see FIG. 2B) in a state in which adhesiveness is generated. The thermoplastic adhesive enters skin of the roof liner 20 to obtain an anchor effect, and firmly bonds the sheet material 12 to the roof liner 20. The bonding portion 13 may be formed only in a range depending on needs such as a wide width and a spot. In addition, it is not necessary to make the sheet material 12 wider than necessary, but it is also possible to form the sheet material 12 in a necessary minimum range. Further, when the wire harness structure 10 is fixed to the roof liner 20, the sheet material 12 may be fixed to the roof liner 20 via the thermoplastic adhesive by pressurizing while warming the bonding portion 13 using a pressurizing member capable of heating.

According to the present embodiment, the wire harness structure 10 in which the wire harness 11 is fixed to the sheet material 12 in advance is formed, and by fixing the wire harness structure 10 to the roof liner 20 via the thermoplastic adhesive, it is possible to easily fix the wire harness 11 to the roof liner 20 without performing operation which takes time and effort such as wiring along a path while loosening entanglement of the wire harness 11. Therefore, the wiring operation on an assembly line can be simplified, and assembly operation time can be shortened. Further, the wire harness 11 can be fixed to the roof liner 20 without requiring a special structure such as processing of an attachment side or a fixing member such as a clip. Further, since the sheet material 12 to which the wire harness 11 is assembled and the roof liner 20 are fixed by the anchor effect of the adhesive (thermoplastic adhesive), certain fixation is possible, and quality is stabilized. Further, a bonding surface (bonding portion 13) can be adjusted by a volume of a circuit, and efficient bonding is possible. Further, the method of fixing a wire harness of the present embodiment is suitable for fixing a narrow portion since there is no need for a component for fixing the wire harness.

The present invention is not limited to the embodiment described above, and modifications, improvements, and the like can be made as appropriate. Materials, shapes, sizes, numerical values, forms, numbers, arrangement positions, and the like of components in the above embodiment are arbitrary and not limited as long as the present invention can be achieved.

Figure 4:
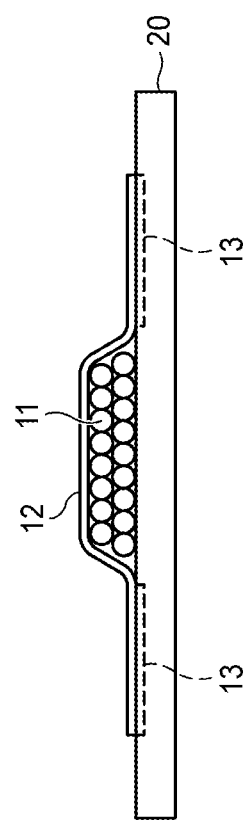
FIG. 4 is a diagram showing another example of the wire harness structure.

For example, in the present embodiment, the wire harness 11 is fixed to the sheet material 12 by sandwiching the wire harness 11 between the two sheet materials 12, but a method of attaching or bonding the wire harness 11 to one sheet material 12 (see FIG. 4) and the like can also be applied. In this case, a thermoplastic adhesive is applied to the same surface as a surface to which the wire harness 11 of the sheet material 12 is fixed.

Here, characteristics of the embodiments of the method of fixing a wire harness according to the present invention described above are summarized briefly in the following [1] to [4], respectively.

[1] A method of fixing a wire harness, in which
forming a wire harness structure (10) by covering a wire harness (11) with a sheet material (12) in which a thermoplastic adhesive is coated on one surface including a required portion so as to fix the wire harness to the sheet material;
spreading the formed wire harness structure on a roof liner (20); and
fixing the wire harness structure to the roof liner with the thermoplastic adhesive by pressurizing the warmed required portion (bonding portion 13).

[2] The method of fixing a wire harness having the configuration of the above [1], in which
the required portion is pressurized by a pressurizing member in a state that the required portion is warmed to generate adhesiveness of the thermoplastic adhesive.

[3] The method of fixing a wire harness having the configuration of the above [1], in which
the pressurizing member can also be heated, and
the required portion is pressurized while being warmed by the pressurizing member.

[4] The method of fixing a wire harness having the configuration of any one of the above [1] to [3], in which
the wire harness is covered by being sandwiched between two sheets of the sheet material.

What is claimed is:

1. A fixing method of a wire harness comprising:
    forming a wire harness structure by covering a wire harness with a sheet material in which a thermoplastic adhesive is coated on one surface including a required portion so as to fix the wire harness to the sheet material;
    spreading the formed wire harness structure on a roof liner; and
    fixing the wire harness structure to the roof liner with the thermoplastic adhesive by pressurizing the required portion warmed,
    wherein the wire harness is covered by being sandwiched between two sheets of the sheet material.

2. The fixing method of the wire harness according to claim 1,
    wherein the required portion is pressurized by a pressurizing member in a state that the required portion is warmed to generate adhesiveness of the thermoplastic adhesive.

3. The fixing method of the wire harness according to claim 1,
    wherein the pressurizing member can also be heated, and the required portion is pressurized while being warmed by the pressurizing member.

4. The fixing method of the wire harness according to claim 1, wherein the wire harness is covered by being sandwiched between the two sheets of the sheet material before the formed wire harness structure is spread on the roof liner and before the wire harness structure is fixed to the roof liner.

\* \* \* \* \*